Aug. 14, 1962    F. R. VLASIC    3,049,322
PARACHUTE MULTIPLE REEFING SYSTEM
Filed April 29, 1957    2 Sheets-Sheet 1

INVENTOR.
FRANK R. VLASIC
BY
ATTORNEYS

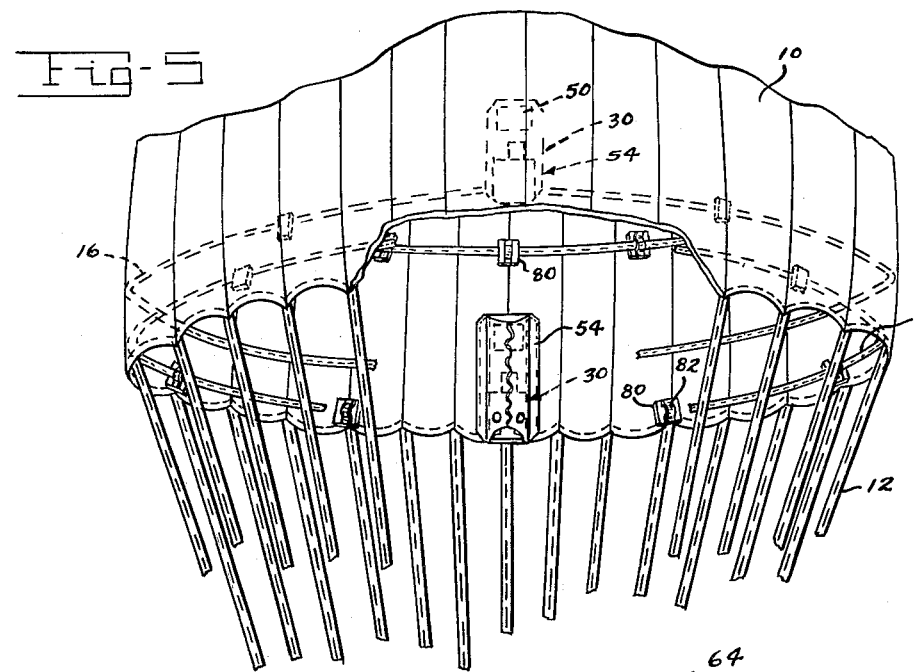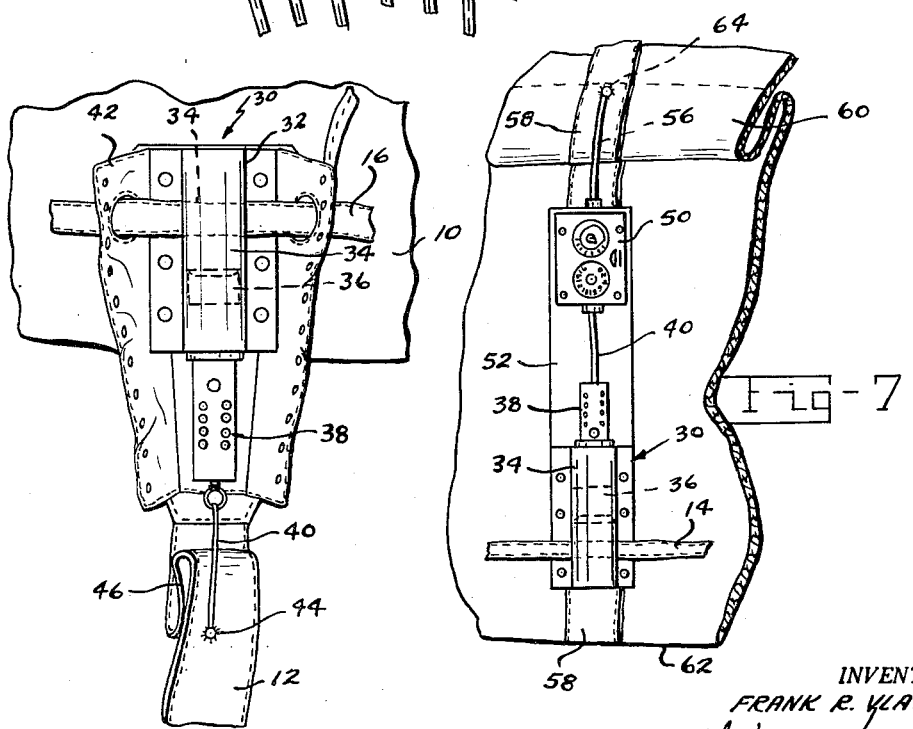

United States Patent Office 3,049,322
Patented Aug. 14, 1962

3,049,322
PARACHUTE MULTIPLE REEFING SYSTEM
Frank R. Vlasic, New Carlisle, Ohio, assignor to the United States of America as represented by the Secretary of the Air Force
Filed Apr. 29, 1957, Ser. No. 655,924
9 Claims. (Cl. 244—152)
(Granted under Title 35, U.S. Code (1952), sec. 266)

The invention described herein may be manufactured and used by or for the United States Government for governmental purposes without payment to me of any royalty thereon.

This invention relates to a parachute multiple reefing system and, more particularly, to a method and apparatus for controlling the amount and time of opening of a parachute in descent and thereby controlling its trajectory.

In the present stage of development of the parachute art and in the art of dropping objects including weapons by parachutes, the need has long been felt for a device or system which would make it possible to control the trajectory of an object being released for descent by parachute.

The object of the present invention is the provision of a system and a device to be made a part of a parachute which will control its trajectory in descent.

A further object of the invention is, broadly, the provision of a multiple reefing system for controlling and timing the opening of a parachute in stages and thereby controlling its trajectory.

More specifically, a further object of the invention is the provision of a series of closed circle reefing lines or cords or loops of predetermined and varying circumferences, graded in size, installed in the parachute canopy to limit its opening, to be cut at predetermined points throughout the fall of the parachute so that its drag area, its rate of descent, its trajectory and ballistic curve can be controlled.

A further object of the invention is the provision of a system for cutting selected ones of a series of reefing lines before the parachute is released or during its descent, which system is controlled by a predetermined plan.

A further object of the invention is the provision of means for controlling the opening of a parachute canopy by governing its rate of fall to comply with predetermined conditions. For example, to follow a planned ballistic curve terminating at a desired point or target at an interval planned to give the delivering aircraft time to leave the area.

A further object of the invention is the provision of a reefing line system which includes controlled means for cutting the reefing lines, which means is incorporated into the canopy in such a way as to provide its own balance.

A further object of the invention is the provision of a new method of attaching closed circle reefing lines or reefing line loops to a canopy skirt for preventing abrasion, tearing, burning and melting of the reefing loops and the canopy skirt caused by high velocity and stress when the lines are cut.

A further object of this invention is the provision of a new means for reducing or eliminating as far as possible the shock accompanying a parachute opening.

A further object of the invention is the introduction of new delivery techniques and techniques for experimental high load testing.

A further object of the invention is the provision of remote control for a parachute staging reefing system wherein the trajectory of the parachute is predetermined.

Other objects will become apparent as the description proceeds.

In the drawing, FIGS. 1 through 4 are fragmentary schematic views of a reefing system showing the successive stages of its operation.

FIG. 5 is a schematic fragmentary view of an opened parachute after the lines have been cut and showing the method by which the reefing line cutters are installed in balanced relationship.

FIG. 6 is a detail view of a cutter and with a time and altimeter control box, showing mechanical trigger means for the control box.

FIG. 7 is a detail of a cutter and mechanical trigger means and showing a fire and abrasive resistant cover for the cutter.

Figures 9, 10, 11:
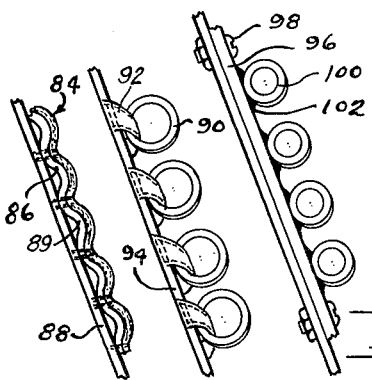
FIGS. 9–11 show three modified devices for securing a reefing line to a parachute.

Referring more in detail to the drawing, a parachute canopy with its attached shroud lines are indicated by the numerals 10 and 12.

It is to be recalled that the ballistic curve an object will follow when it leaves an aircraft is determined by the amount of drag and air resistance it presents during its descent. The invention contemplates controlling the drag by controlling the opening of the parachute in stages so that a predetermined ballistic curve or trajectory is followed during its descent. The means of control comprises a series of reefing lines indicated in the drawing by numerals 14, 16, 18 and 20. These reefing lines are closed circles of graded circumference and are secured to the interior of the parachute as near to the skirt edge as possible and by means which allow free passage and sliding.

Figure 1:
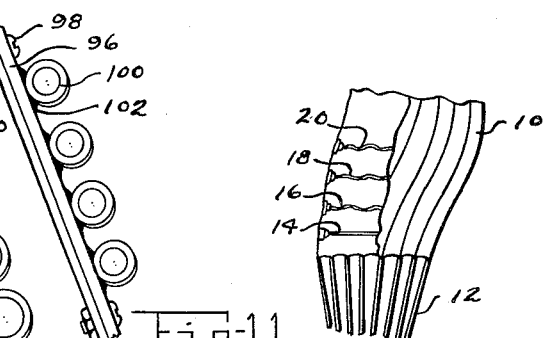
Figure 2:
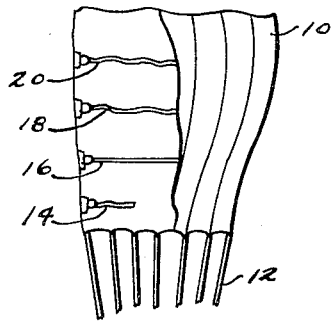
Figure 3:
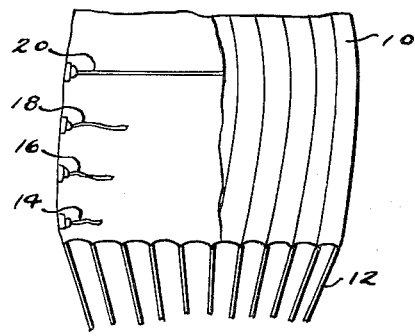
Figure 4:
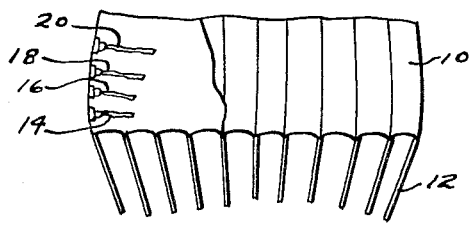

FIGS. 1 through 4 show, by way of example, successive stages of an operation. FIG. 1 shows the first stage after release of the parachute from an aircraft. None of the reefing lines have been cut. The canopy 10 is restrained from any opening at all beyond the confining limits of the reefing line 14 and in this condition presents a minimum of drag. In FIG. 2, reefing line 14 has been cut and the canopy opened to the limit defined by the line 16. In FIG. 3, all of the lines have been cut except the last line 20, which restrains the canopy from complete opening. In FIG. 4, all lines have been cut and the canopy is free for complete opening.

Figure 8:
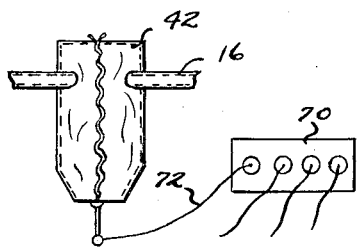
FIG. 8 is a schematic view of a cutter incased in a fire resistant cover and operated by remote control.

The cutting may be done from the pilot's or navigator's position by remote control before, or at the time, the parachute is released from the aircraft, as later described in connection with FIG. 8 of the drawing, or it may be done by time or altiude controlled and preset means. For disclosures of devices of this nature see: United States Air Force Parachute Handbook, WADC TC 55–265, December 1956, ASTIA Doc. No. AD118036, page 6–3–6, FIG. 6–3–9, Type F–1A–Automatic Parachute Rip Chord Release. In either event, each reefing line is supplied with a cutter, indicated generally by the numeral 30, and shown in FIGS. 5 and 6. These cutters are secured to the canopy and are of any standard construction. For example, a cylinder 32 is provided with a transverse opening 34 through which the reefing line is threaded. The casing 38 contains a trigger mechanism which ignites an explosive charge contained in the chamber located behind the piston 36. The trigger mechanism is triggered into action by a pull cord 40. The trigger mechanism may or may not incorporate a time delay.

The pull cord 40 is operated either by a mechanical means or by altitude and time control. FIG. 6 shows a mechanical method of applying pull pressure to the pull cord 40.

The cutter of FIG. 6 is enclosed in a heat and abrasion resistant casing 42, which is secured to the canopy skirt edge and one of the shroud lines. The pull cord is attached to the shroud line by any means, such as stitching 44, a segment of the shroud line between the skirt edge and the point of stitching being made into a fold 46. The unfolding to full extension of the shroud line pulls the cord 40 activating the time delay trigger to trigger the explosive.

In FIG. 7 a control box 50, containing an altimeter and a timer, is introduced into the system. Both the cutter and the control box are secured to a plate 52 and encased in a fire resistant and abrasion resistant casing, shown at 54 in FIG. 5. The timer and altimeter are both preset and remain inactive until the control box is activated by a pull cord 56. In this case, the pull cord is secured to a reinforcement 58 in the canopy, which may be a continuation into the canopy of one of the shroud lines, a fold 60 being made in the canopy and reinforcement between the skirt edge 62 of the canopy, and the point of attachment 64 of the pull cord 56. It will be seen that the control box, preset, remains inactive until the unfolding of the parachute. This pulls the cord 56, activating the timer and/or altimeter in the control box, cutting the reefing line 14 at the preset time and/or altitude.

In this arrangement, the control box is activated by mechanical means, and by the opening of the parachute.

A system may also be devised wherein either the timer 38, which is part of the cutter, or the control box 50 containing an altimeter and timer, are activated by electrical remote control means. The pull cord 40 attached to the cutter, or the pull cord 56 attached to the control box, may be connected to a master electrical control box, indicated by the numeral 70 in FIG. 8. This control box may be located within reach of the pilot or navigator. The connecting wire 72 is of very small size and is packed with connections intact when the parachute is packed. It is frangible, and does not interfere, either with the packing or the deployment of the parachute, simply breaking as the parachute deploys after its mission has been accomplished. In this case, the actual cutting of selected reefing lines is done at the control box before or at the time the parachute is released from the aircraft.

The means of attaching the reefing lines to the parachute, either on the outside of the canopy (not shown) or on the inside, is of extreme importance. The device employed must allow for threading of the line during construction and assembly. In addition, when a line is cut and a portion of the canopy is freed for opening, the cut line travels through the loop at a terrific speed and with great tugging stress, especially on the inward portion of the securing ring or loop.

Several devices have been worked out for preventing damage from friction, burning, melting, tearing or abrasion during this significant interval.

Separate individual securing pads 80 are shown in FIG. 5, provided with loops stitched, or otherwise secured thereto. These loops have a lining of abrasion resisting material.

FIGS. 9, 10 and 11 show modified forms of the reefing line holding means.

In FIG. 9, a laminated strip of material 84 is provided with a cotton or other abrasion resistant buffer lining 86. This laminated strip is secured to a base member, such as the plate 88, preferably by stitching at intervals, and in such a manner as to form loops 89 adjacent each other, and capable of receiving a reefing line. This base plate is of any suitable material and is secured to the inner surface of the canopy, preferably at a radial seam or seam reinforcement, and is duplicated at suitable intervals.

In FIG. 10, metal rings 90 are held loosely by a series of transversely placed loops 92, which are stitched or otherwise secured to the canopy or to a base member 94, made of fabric, metal or other suitable material.

A third modification is shown in FIG. 11. A metal plate 96 is secured to the interior of the canopy at a seam by bolt and screw means 98, or by any other suitable means. Metal rings 100 are welded at 102 or otherwise secured to the base plate 96 at a portion of their exterior circumference, to form a row of ring openings lying in a plane normal to the plane of the base plate.

FIG. 5 also shows the method of installing the cutters, with or without control boxes in balanced relationship, on the canopy. A cutter and control box 104 is shown in phantom in FIG. 5.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A parachute multiple reefing system comprising a parachute canopy, a plurality of closed circle reefing lines of graded size, means for slidably securing each of said reefing lines to said parachute canopy in the area adjacent the skirt edge and vertically spaced from each other, said means comprising abrasion resistant reefing line loops, a cutter for each reefing line, a trigger for triggering each cutter to cut selected ones of said reefing lines in a predetermined sequence and at predetermined time intervals for controlling the trajectory of said parachute.

2. A device for slidably attaching a plurality of reefing lines to a parachute canopy comprising a strap, means adapted for attaching said strap to a radial seam of a parachute skirt, a laminated strip secured to said strap at intervals to form loops between said strip and said strap, said laminated strip including an abrasion and heat resistant lining.

3. A multiple reefing system for controlling in stages the opening of a parachute and thereby determining its trajectory, comprising a parachute canopy, a plurality of series of closed circular lines of different diameters extending around the canopy, means for securing each of said lines to the interior of said canopy at vertically spaced intervals, said means comprising a row of loops secured to the interior of said canopy adjacent the edge thereof and spaced around the circumference thereof for slidably confining the circular line of smallest diameter, a second row of loops vertically spaced from said first row for slidably confining the circular line of next largest diameter, other vertically spaced rows of loops for slidably confining other circular lines of successively increasing diameters to free the canopy for opening in controlled stages, and means for cutting said lines in predetermined order.

4. The method of controlling the trajectory of a parachute canopy having a skirt released from an aircraft comprising, confining the edge of said parachute skirt against opening during the initial stages of its fall, and thereafter allowing opening of said canopy only in graded full circles at predetermined stages.

5. A system for controlling the trajectory of a parachute dropped from an aircraft by controlling and staging the opening of the parachute, said system comprising a series of closed loop confining means secured to the canopy skirt of said parachute at the area adjacent its edge, said series of confining means being releasable and of loops of graded size, means for releasing selected ones of said confining means at selected intervals.

6. In a parachute reefing system for effecting the controlled opening of a parachute in predetermined stages, a parachute canopy, a series of closed circle reefing lines, said circles being of graded size, a plurality of securing means for slidably attaching each line to the interior of said parachute canopy at spaced intervals around the skirt edge thereof and maintaining said canopy in a state of limited opening defined by the circumference of the smallest uncut circle of the series, and a cutting means provided for each line for cutting said line at a predetermined time-altitude controlled interval.

7. A device for slidably attaching a plurality of reefing lines to a parachute canopy comprising an elongated base member adapted to be secured to a seam of said canopy, fabric loops secured to said base member and distributed along its length, the inner portion of said loop being of heat, abrasion and stress resistant material.

8. In a device according to claim 6 a triggering device for triggering said cutting means comprising a timer positioned on said canopy for timing the operation of said triggering device after activation thereof, shroud lines, a fold in selected ones of said shroud lines, a cord attached at one end to said timer for activation of said timer and attached at its opposite end to a shroud line at a point thereon beyond the fold of said line, the cord being shorter than the length of folded shroud line so that said timer is activated when the shroud line is extended.

9. In a parachute canopy having a plurality of reefing lines for effecting staged opening of said canopy, a device for attaching said reefing lines to said canopy in sliding relation thereto, said device comprising an elongated base member adapted to be secured to said canopy skirt along a seam thereof, a plurality of rings, a portion of the exterior circumferential edge of each ring being secured to said base member to form a row of openings extending along the length of said base member, said openings lying in a common plane normal to the plane of said base member, each ring being adapted to slidably receive a reefing line.

References Cited in the file of this patent
UNITED STATES PATENTS

| | | |
|---|---|---|
| 1,843,597 | Coffman | Feb. 2, 1932 |
| 2,508,754 | Frieder et al. | May 23, 1950 |
| 2,626,117 | Heinrich | Jan. 20, 1953 |
| 2,732,153 | Frieder et al. | Jan. 24, 1956 |
| 2,742,697 | Gross | Apr. 24, 1956 |
| 2,755,550 | Benjamin | July 24, 1956 |

FOREIGN PATENTS

| | | |
|---|---|---|
| 748,009 | Great Britain | Apr. 18, 1956 |

OTHER REFERENCES

Summary Report, No. F–SU–1107–ND, Headquarters Air Material Command, Wright Field, Dayton, Ohio.